INVENTORS
LYLE W. BEMENT
WILLIAM L. MORNING
JAMES E. BENJAMIN
RICHARD P. SOUTH
RICHARD B. THOMPSON
JAMES M. ANGLIN

BY
Robert Gevins
ATTORNEY

INVENTORS
LYLE W. BEMENT
WILLIAM L. MORNING
JAMES E. BENJAMIN
RICHARD P. SOUTH
RICHARD B. THOMPSON
JAMES M. ANGLIN

BY Robert Levine
ATTORNEY

United States Patent Office 3,460,032
Patented Aug. 5, 1969

3,460,032
CAPACITOR TESTING APPARATUS INCLUDING TIMER MEANS FOR CONTROLLING THE DISCHARGE TIME THROUGH DIFFERENT RESISTANCES
Lyle W. Bement, William L. Morning, James E. Benjamin, Richard P. South, Richard B. Thompson, and James M. Anglin, Indianapolis, Ind., assignors to P. R. Mallory & Co. Inc., Indianapolis, Ind., a corporation of Delaware
Filed July 18, 1967, Ser. No. 654,177
Int. Cl. G01r 27/26, 11/52
U.S. Cl. 324—60                                27 Claims

ABSTRACT OF THE DISCLOSURE

A circuit containing capacitance and unknown values of resistance is charged or discharged through two values of known resistance. Time intervals required for predetermined ratio changes in voltage across the circuit are measured for each value of known resistance. The time intervals and values of the known resistances are then combined by analog computation circuits to yield a direct meter reading of the capacitance of the circuit. A correction factor based on an open-circuit voltage of the circuit when fully charged allows reduction of errors caused by low leakage or shunt resistance in the circuit.

---

The formation of solid, oxide-coated capacitor anodes in a formation bath requires that the capacitance of a batch of anodes be tested or monitored in order to determine the time at which the desired capacitance has been reached by sufficient growth of the oxide coating in the bath. Currently, a batch of anodes is immersed in the bath until a previously-computed formation voltage has been attained; the batch is then held at this voltage for a period of time in order to minimize capacitance variations among the individual anodes. The batch is next removed from the formation bath and a small number of anodes is removed and destructively tested for capacitance. If the capacitance of these anodes proves to be higher than the design value, the formation process is continued with a higher formation voltage and the batch is again sample-tested. This process is repeated until the correct capacitance has been reached.

Removal of the anodes from the formation bath and sample testing, however, lead to delays and waste which increase the cost of the capacitors. The present invention therefore provides as a principal object an instrument whereby a capacitor or a group of capacitors may be tested for capacitance in situ. The primary problem to be overcome is the fact that the capacitor anodes and the formation circuit include unknown and inextricable resistances associated with the electrical capacitance of the anodes; accordingly, another object of the invention is to provide a testing instrument whereby capacitance may be measured in the presence of unknown resistances. A further object is to provide an instrument which requires few or no internal connections to or modifications of an anode formation apparatus. Still a further object is to provide an analog capacitance-measuring instrument which is simple and inexpensive, and which provides a direct meter indication in terms of capacitance. Another aspect of the invention relates to the means and instrumentalities used therewith, whether or not such instrumentalities are employed for a similar purpose or within the field primarily contemplated by the invention.

Other objects and advantages of the invention, as well as modifications obvious to those skilled in the applicable arts, will become apparent from the following description of several preferred embodiments of the invention, taken in conjunction with the accompanying drawing, in which.

Basically, an instrument according to the present invention includes a means selectively operable to charge or to discharge the circuit through a known resistance $R_k$. Although the capacitance measurement may be made during either the charging cycle or the discharging cycle, the latter is chosen in the following description because the cricuit is normally in a charged state in the environment primarily contemplated. The instrument further includes a timer means for measuring first and second time intervals $T_1$ and $T_2$ defined by predetermined ratio changes $\rho_1$ and $\rho_2$ respectively in the measured voltage $E_m(t)$ across the known resistance $R_k$. Another means operates to select a first value of the known resistance, $R_k = R_1$, during the first interval $T_1$ and to select a second value of the known resistance, $R_k = R_2$, during the second interval $T_2$. Next, a means for scaling $T_1$ and $T_2$ in accordance with the constant ratios $\rho_1$ and $\rho_2$ provides the scaled intervals $$\frac{T_1}{-\ln \rho_1} \text{ and } \frac{T_2}{-\ln \rho_2}$$

where ln denotes the natural logarithm. A means for obtaining an arithmetic difference between the scaled intervals and a means for scaling this difference in accordance with the values of $R_1$ and $R_2$ than provide a scaled difference $$\left(\frac{T_1}{-\ln \rho_1} - \frac{T_2}{-\ln \rho_2}\right)/(R_1 - R_2)$$

Obviously, scaling by the constant factor $R_1 - R_2$ may be accomplished either before or after the arithmetic difference is obtained; also, if $\rho_1 = \rho_2$, then scaling by the logarithmic factor may be accomplished after the difference is obtained, instead of before. Finally, a display means responds to the latter scaling means for indicating the scaled difference in terms of the capacitance $C_1$ of the circuit.

In cases where a low shunt resistance in the circuit interferes with measurement of its capacitance, accuracy may be improved by adding a simple correction factor to the instrument. If the above-mentioned selectively-operable means is also made operable to open the circuit for measurement of an open-circuit voltage $E_o$ across the charged capacitance $C_1$, then a means for measuring $E_o$ and the voltage $E_{B1}$ of a source of charging potential for the circuit may obtain a ratio $E_o/E_{B1}$. A means for further scaling the previously-noted scaled difference in accordance with this ratio then provides the quantity $$\frac{E_{B1}}{E_o} \cdot \left(\frac{T_1}{-\ln \rho_1} - \frac{T_2}{-\ln \rho_2}\right)/(R_1 - R_2)$$

This quantity is then presented to the display means for indicating capacitance as before. The display means may be itself used as the means for measuring $E_o$ and $E_{B1}$ by providing it with a suitable multi-position switch.

Figure 1:
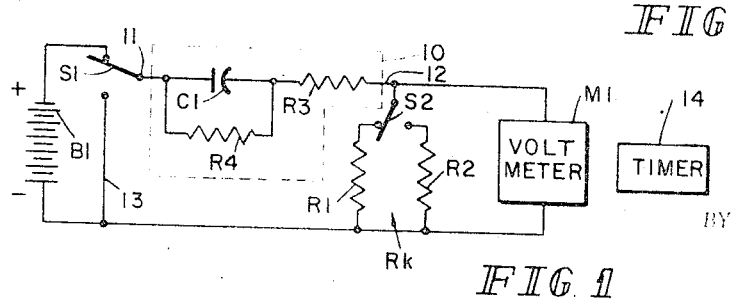
FIGURE 1 is a schematic diagram of a capacitive circuit and illustrates means for measuring the capacitance thereof according to the invention.

Referring more particularly to the drawing, FIGURE 1 shows a capacitive circuit 10 having an equivalent capacitance $C_1$, an unknown series resistance $R_3$ and a relatively high shunt or leakage resistance $R_4$. It will be realized, of course, that the elements $C_1$, $R_3$ and $R_4$ are conceptual only, and that the only physically accessible points of the circuit 10 are the leads 11 and 12. Measurement of the capacitance $C_1$ of the circuit 10 is carried out in the following manner. During the formation of oxide-coated capacitor anodes, the circuit 10 will be charged by the potential source or battery $B_1$ by connecting $B_1$ to the lead 11 through the selectively operable means or switch $S_1$. After the circuit 10 has reached equilibrium, $S_1$ is moved at a time $t_o$ to discharge the circuit through the lead 13. At this point in time, a switch $S_2$ operable to select either a first value $R_1$ or a second value $R_2$ of the known resistance $R_k$ discharges the circuit 10 through $R_1$. The voltage $E_m(t)$ across $R_k$ is measured by a voltmeter $M_1$. At an arbitrary time $t_1$ during the discharge, the voltage $E_m(t_1)$ is noted and a timer 14 is started. Discharge through $R_1$ is continued until a time $t_2$ at which $E_m(t_2)=\rho_1 E_m(t_1)$, where $\rho_1<1$ is a first predetermined ratio; the timer 14 is then shut off and a first interval $T_1=t_2-t_1$ is recorded or stored. Next, $S_2$ is moved to select $R_k=R_2$, and discharge of the circuit 10 is continued. At a later time $t_3$, the voltage $E_m(t_3)$ is noted and the timer 14 restarted. Then at a time $t_4$ for which $E_m(t_4)=\rho_2 E_m(t_3)$, where $\rho_2<1$ is a second predetermined ratio, the timer is shut off and a second interval $T_2=t_4-t_3$ is recorded. The recorded values of $T_1$ and $T_2$ may then be adjusted in accordance with the values of $R_1$, $R_2$, $\rho_1$ and $\rho_2$ to yield the value of the unknown capacitance $C_1$.

Mathematically, the above procedure finds two values of time constant, $\tau_1$ and $\tau_2$, for the circuit 10 according to the equations $\tau_1=C_1(R_1+R_3)$ and $\tau_2=C_1(R_2+R_3)$, which may be solved to eliminate the unknown resistance $R_1$ and to yield the value of the circuit capacitance as $$C_1 = \frac{\tau_1 - \tau_2}{R_1 - R_2}$$

The time constants $\tau_1$ and $\tau_2$ may be ascertained by noting that, during discharge of the circuit 10, $$\frac{E_m(t_2)}{E_m(t_1)} = \rho_1 = e^{-T_1/\tau_1}$$

and $$\frac{E_m(t_4)}{E_m(t_3)} = \rho_2 = e^{-T_2/\tau_2}$$

Thus the equation for capacitance becomes $$C_1 = \left(\frac{T_1}{-\ln \rho_1} - \frac{T_2}{-\ln \rho_2}\right) / (R_1 - R_2)$$

If, however, the voltage ratios are chosen such that $\rho_1=\rho_2=1/e$, then the logarithms become unity, and $$C_1 = \frac{T_1 - T_2}{R_1 - R_2}$$

This particularly simple form of the equation for $C_1$ will hereinafter be employed. It will be noted that the above equations may be modified in an obvious manner to allow capacitance measurement to be performed while the circuit 10 is being charged rather than discharged.

Figure 2:
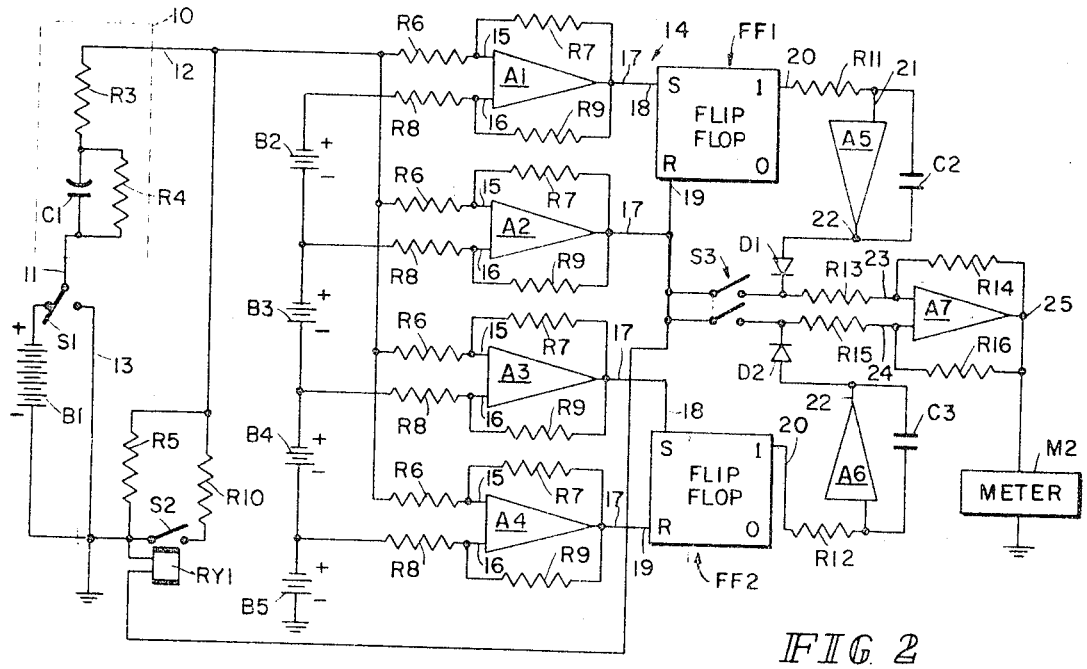
FIGURE 2 shows a first form of instrument for measuring capacitance according to the invention.

FIGURE 2 illustrates an instrument for automatic measurement of $C_1$ according to the above procedure. To initiate the measurement after the circuit 10 has been charged, $S_1$ is moved to discharge the circuit 10 through the first known resistor $R_5=R_1$. The voltage $E_m(t)$ across $R_5$ is supplied to the timer 14 via the inverting or subtractive inputs 15 of two pairs of voltage comparing means, here shown as the operational amplifiers $A_1$ through $A_4$. Meanwhile, a plurality of constant reference voltages $E_{r1}$ through $E_{r4}$ is supplied to the noninverting or additive inputs 16 of the amplifiers from the batteries $B_2$ through $B_5$. The respective voltages of these batteries are chosen so that $$\frac{E_{B3}+E_{B4}+E_{B5}}{E_{B2}+E_{B3}+E_{B4}+E_{B5}} = \frac{E_{r3}}{E_{r1}} = \rho_1$$

and $$\frac{E_{B5}}{E_{B4}+E_{B5}} = \frac{E_{r4}}{E_{r3}} = \rho_2$$

The input resistors $R_6$ and $R_8$ and the feedback resistors $R_7$ and $R_9$ determine the gains of the amplifiers $A_1$ through $A_4$.

The voltage at the output 17 of each of the amplifiers becomes positive when the voltage at its additive input 16 exceeds the voltage at its subtractive input 15. Therefore, the output 17 of $A_1$ becomes positive at time $t_1$, when $E_m(t)=E_{r1}$; similarly the output 17 of $A_2$ is positive at time $t_2$, when $E_m(t)=E_{r2}$; the output 17 of $A_3$ is positive at $t_3$, when $E_m(t)=E_{r3}$; and the output 17 of $A_4$ is positive at $t_4$, when $E_m(t)=E_{r4}$. That is, the outputs 17 generate marking signals upon the beginning and ending of each of the intervals $T_1$ and $T_2$. The marking signals are next conveyed to the inputs 18 and 19 of a pair of flip-flops $FF_1$ and $FF_2$. These flip-flops are constructed so that a signal at the "set" input 18 causes a constant voltage to be maintained at a "logical one" output 20 until the flip-flop receives a signal at the "reset" input 19, at which time the voltage at output 20 drops to ground potential. It will thus be appreciated that connecting the output of $A_1$ to the input 18 of $FF_1$ and the output of $A_2$ to the input 19 of $FF_1$ will cause a constant voltage to appear at the output 20 of $FF_1$ for the duration of the interval $T_1$, and that similar connections from $A_3$ and $A_4$ to $FF_2$ will cause a constant voltage to appear at the output 20 of $FF_2$ for the duration of the second interval $T_2$. The output 17 of $A_2$ is also connected to the coil of a relay $RY_1$, so that the marker signal indicating the end of $T_1$ at time $t_2$ also closes $S_2$ to insert a second resistor $R_{10}$ into the discharge circuit, providing the second value of known resistance, $$R_2 = \frac{R_5 R_{10}}{R_5 + R_{10}}$$

It will be noted that this method of switching the known resistance avoids problems of arcing and current surges in the circuit which may appear with the configuration shown in FIGURE 1.

The constant voltages from the outputs 20 are delivered to a pair of integrating operational amplifiers $A_5$ and $A_6$ whose input resistors $R_{11}$ and $R_{12}$ and feedback capacitors $C_2$ and $C_3$ determine their respective scale factors. The voltage at the input 21 of such an integrator is related to the voltage at its output 22 by the relation $E_{out}(t)=h\int E_{in}(t)dt$, where $h$ is the scale factor of the integrator. Because of the aforementioned characteristics of the voltages appearing at the inputs 21, the final voltages $E_{f1}$ and $E_{f2}$ at the outputs 22 of $A_5$ and $A_6$ will be proportional to $h_{A5}(t_2-t_1)=h_{A5}T_1$ and $h_{A6}(t_4-t_3)=h_{A6}T_2$ respectively. The scale factors $h_{A5}$ and $h_{A6}$ of $A_5$ and $A_6$ are adjusted to reflect the values of $\rho_1$ and $\rho_2$ respectively; if $\rho_1=\rho_2=1/e$, then $h_{A5}=h_{A6}=1$. Since the integrators will not automatically return to zero after the measurement is completed, a DPST switch $S_3$ is provided to discharge them manually through the isolation diodes $D_1$ and $D_2$ and through the coil of $RY_1$ in order to reset the instrument for subsequent measurements.

The timer 14, here comprising the batteries $B_2$ through $B_5$, the operational amplifiers $A_1$ through $A_6$, the flip-flops $FF_1$ and $FF_2$ and associated circuitry, thus provides and stores two voltages $E_{f1}$ and $E_{f2}$ which are respectively proportional to $T_1$ and $T_2$. Next, an operational amplifier $A_7$, employed as an analog subtractor, accepts $E_{f1}$ at an additive input 23 and also accepts $E_{f2}$ at a subtractive input 24. Scale factors for A7 are adjusted by $$h_{A7a} = \frac{R_{14}}{R_{13}} \text{ and } h_{A7b} = \frac{R_{16}}{R_{15}}$$

so that the voltage $E_s$ at the output 25 is $$E_s = h_{A7a}E_{f1} - h_{A7b}E_{f2}.$$

These scale factors could also be used instead of the scale factors $h_{A5}$ and $h_{A6}$ to enter the values of $-\ln \rho_1$ and $-\ln \rho_2$; if, however, $-\ln \rho_1$ and $-\ln \rho_2$ have been entered via $h_{A5}$ and $h_{A6}$, then the factors $h_{A7a}$ and $h_{A7b}$ may be employed to introduce the necessary first and second values $R_1$ and $R_2$ of the known resistance $R_k$ by setting $$h_{A7a} = h_{A7b} = \frac{1}{R_1 - R_2} = \frac{R_5 + R_{10}}{R_5^2}$$

It now becomes apparent that $E_s$ is directly proportional to the capacitance $C_1$ of the circuit 10, so that a display means or voltmeter $M_2$ responsive thereto may be calibrated directly in terms of capacitance.

Figure 3:
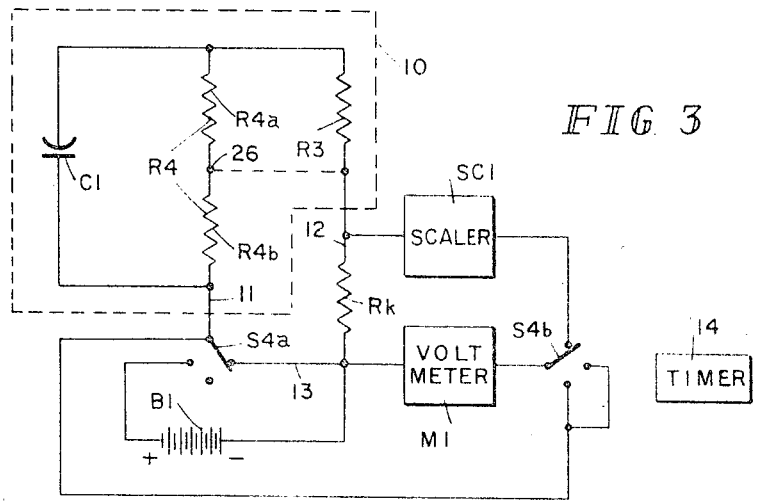
FIGURE 3 is a schematic diagram of a capacitive circuit having low shunt resistance and means for improving the accuracy of a capacitance measurement according to the invention.

The circuit of FIGURE 3 depicts another means for measuring capacitance according to the invention. Returning for a moment to FIGURE 1, it will be seen that the accuracy of the measurement therein contained depends upon the fact that the resistance of $R_4$ is sufficiently great that it will not significantly affect the time constant of the circuit 10 upon discharge. When, however, $R_4$ is considered explicitly in the measurement equation, $$C_1 = \frac{R_3 + R_4}{R_4} \cdot \frac{T_1 - T_2}{R_1 - R_2} + \frac{1}{R_4} \cdot \frac{R_1 T_1 - R_2 T_2}{R_1 - R_2}$$

wherein the first factors of the first and second terms approach unity and zero respectively for large $R_4$. Even for relatively low $R_4$, however, accuracy of measurement may be improved while retaining the simplicity of the computation process merely by introducing a multiplicative correction factor into the equation previously used for large $R_4$.

In FIGURE 3, the equivalent shunt or leakage resistance $R_4$ is conceptually divided into a pair of series resistors $R_{4a}$ and $R_{4b}$. If the values of these resistances are properly chosen, their junction 26 will assume the same voltage as that of the lead 12, which lead joins the equivalent series resistance $R_3$ and the known resistance $R_k$. Since two points of identical potential within a circuit may always be tied together without affecting the circuit's operation, a virtual connection may be made between the junction 26 and the lead 12. Proper values for the components of the equivalent shunt resistances may be easily calculated to be $$R_{4a} = \frac{R_3 R_4}{R_3 + R_k}$$

and $$R_{4b} = \frac{R_k R_4}{R_4 + R_k}$$

with the switch $S_{4a}$ in the position shown in FIGURE 3 for discharge of the circuit 10, $R_{4b}$ is effectively in parallel with $R_k$, so that the voltmeter $M_1$ reads not the voltage across the known resistance $R_k$ but rather the voltage across a lower resistance $$R_x = \frac{R_{4b} R_k}{R_{4b} + R_k} = \frac{R_k R_4}{R_k + R_3 + R_4} = HR_k$$

where $$H = \frac{R_4}{R_k + R_3 + R_4}$$

For this reason, inaccuracies because of low $R_4$ may be said to arise from an error H in the value of the "known" resistance $R_k$. Although H will have a first value $H_1$ for $R_k = R_1$ and a different value $H_2$ for $R_k = R_2$, $H_1 \simeq H_2$ if the values of $R_1$ and $R_2$ are fairly close to each other, or if $R_k \ll R_3 + _4$. Therefore, the exact equation $$C_1 = \frac{T_1 - T_2}{H_1 R_1 - H_2 R_2}$$

may be closely approximated by $$C_1 = \frac{1}{H_1} \cdot \frac{T_1 - T_2}{R_1 - R_2}$$

When the switch $S_{4a}$ is connected to the battery $B_1$, the switch $S_{4b}$ mechanically coupled to $S_{4a}$ allows the meter $M_1$ to read the battery voltage, or charging potential, $E_{B1}$. When $S_{4a}$ is moved to a middle position between the battery $B_1$ and the discharging lead 13, the charged circuit 10 is opened, and $S_{4b}$ allows an open-circuit voltage to be measured by $M_1$. If $M_1$ has sufficiently high input impedance that the voltage-divider effects of $R_3$ and $R_k$ thereon are negligible, then this voltage is the open-circuit voltage $E_o$ of the capacitor $C_1$. But, because of the voltage-divider effect of $R_4$, $R_3$ and $R_1$ during the charging of the circuit from $B_1$.

$$\frac{E_o}{E_{B1}} = \frac{R_4}{R_1 + R_3 + R_4} = H_1$$

so that the necessary correction factor $H_1$ may be obtained by measuring $E_{B1}$ and $E_o$ within the circuit. The factor $H_1$ is set into an adjustable scaler $SC_1$, so that the meter $M_1$ reads a corrected voltage when the switch $S_{4a}$ and $S_{4b}$ is moved to discharge the circuit 10 through the lead 13.

Figure 4:
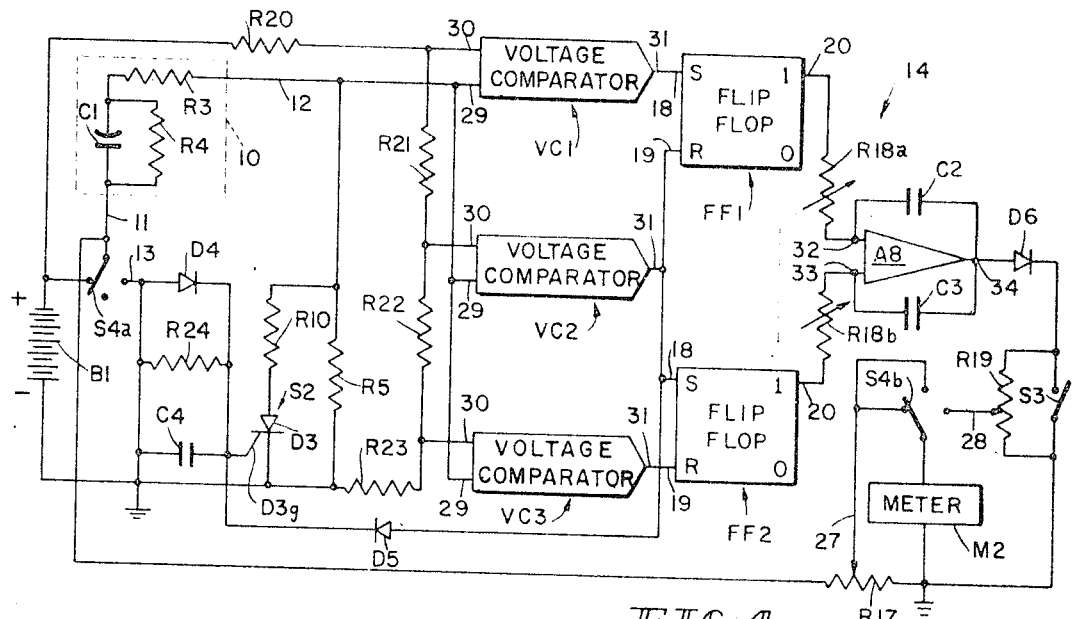
FIGURE 4 shows a second form of instrument according to the invention.

In the instrument shown in FIGURE 4, the two-section, three-position selectively operable switch $S_{4a}$ and $S_{4b}$ is first moved to a position wherein the circuit 10 is charged from $B_1$ with $R_5$ in the circuit and wherein the high-impedance voltmeter $M_2$ is connected to the wiper 27 of a high-resistance voltage divider or potentiometer $R_{17}$ running from the lead 11 of the circuit 10 to ground. The wiper 27 is adjusted until the meter $M_2$ reads full scale on an auxiliary 0.0–1.0 linear scale. Next, the switch $S_{4a}$ and $S_{4b}$ is moved to a middle position wherein the circuit 10 is opened and wherein $M_2$ remains connected to the wiper 27. The auxiliary scale of $M_2$ will now read directly the ratio.

$$\frac{E_o}{E_{B1}} = H_1$$

This ratio may then be set into the ganged variable resistors $R_{18a}$ and $R_{18b}$ by means of a calibrated dial (not shown), thereby adjusting the scale factors of an integrating operational amplifier $R_8$ in accordance with the correction factor $1/H_1$ for the effect of the shunt resistance $R_4$ in the circuit.

The remainder of the measurement follows the description given for the instrument of FIGURE 2. FIGURE 4 will therefore be described in detail only insofar as modifications are made to the circuit of FIGURE 2. After the correction factor has been obtained and introduced into the instrument, the switch $S_{4a}$ and $S_{4b}$ is moved to discharge the circuit 10 through the first value $R_5$ of the known resistance $R_k$; this action also connects $M_2$ to the wiper 28 of a potentiometer $R_{19}$. As the circuit 10 discharges, the voltage $E_m(t)$ across the known resistance $R_k$ is supplied to the inputs 29 of the voltage comparators $VC_1$, $VC_2$ and $VC_3$. These comparators are constructed so that a pulse appears at the output 31 when the voltage at the input 30 exceeds that at the input 29. Conventional in design, these comparators may conveniently comprise a variable-threshold Schmitt trigger followed by a differentiator or a one-shot pulse generator. Instead of using the batteries $B_2$ through $B_5$, this form of the instrument obtains its reference voltages $E_{r1}$, $E_{r2}$ and $E_{r3}$ from the battery $B_1$ through a resistive voltage divider comprising $R_{20}$ through $R_{23}$. $R_{20}$ must of course be sufficiently large that the reference voltage $E_{r1}$ applied to the input 30 of $VC_1$ is less than the initial voltage applied to the input 29 of $VC_1$, allowing for the fact that $C_1$ will not be charged to the full battery voltage $E_{B1}$ even at equilibrium, because of the presence of $R_4$ in the circuit 10.

The resistances $R_{20}$ through $R_{23}$ are selected so that $$\frac{E_{r2}}{E_{r1}} = \rho_1$$

and $$\frac{E_{r3}}{E_{r2}} = \rho_2$$

When, at a time $t_1$, the decreasing voltage $E_m(t)$ at the input 29 of $VC_1$ equals $E_{r1}$ at the input 30 of $VC_1$, this comparator generates a pulse at its output 31, which triggers the "set" input 18 of the flip-flop $FF_1$ as has been described previously. The "one" output 20 of $FF_1$ thereupon supplies a constant voltage to the additive input 32 of an integrating operational amplifier $A_8$ until the "reset" input 19 of $FF_1$ is triggered by a pulse from the output 31 of $VC_2$ at a time $t_2$; this pulse is generated when $E_m(t_2) = E_{r2} = \rho_1 E_{r1} = \rho_1 E_m(t_1)$. The pulse emanating from $VC_2$ also closes the switch $S_2$ and triggers the input 18 of $FF_2$ to begin measurement of the second interval immediately upon termination of the first; that is, $t_3 = t_2$. It is possible to reduce the number comparators from four to three in this way because of the extremely fast switching action of the semiconductor switch or silicon controlled rectifier $D_3$ used as the switch $S_2$ to connect $R_{10}$ into the discharge circuit. The SCR $D_3$ is made conducting and is latched in a conducting state by a pulse applied to its gate $D_{3g}$ by the output 31 of $VC_2$. The capacitor $C_4$, resistor $R_{24}$ and diode $D_4$ prevent damage to $D_3$ from excessive power or incorrect polarity of the pulse applied to $D_{3g}$; $R_{24}$ also acts to prevent hang-up of $D_{3g}$ from a retention of charge on $C_4$. An isolation diode $D_5$ prevents the pulse-stretching effect of $C_4$ and $R_{24}$ from interfering with the later pulse at the input 19 of $FF_2$. The output 20 of $FF_2$ now provides a constant voltage to the subtractive input 33 of $A_8$ from the time $t_2 = t_3$ until a time $t_4$ at which $E_m(t_4) = E_{r3} = \rho_2 E_{r2} = \rho_2 E_m(t_3)$, whereupon $VC_3$ generates a pulse at its output 31 and feeds it to the input 19 of $FF_2$.

After time $t_4$, which is the end of the second interval $T_2$, the output 34 of the integrating amplifier holds a voltage proportional to $$\frac{1}{H_1}(T_1 - T_2)$$

that is, $A_8$ also acts as an analog subtractor in this configuration. Although it is also possible to adjust the scale factors of $A_8$ to reflect the values of $\rho_1$ and $\rho_2$, it is convenient to make $\rho_1 = \rho_2 = 1/e$ so that no separate adjustment is necessary therefor. The voltage existing at the output 34 of $A_8$ is next fed through an isolation diode $D_6$ into a voltage divider or potentiometer $R_{19}$, whose wiper 28 has been manually adjusted in accordance with the constant multiplicative factor $$\frac{1}{R_1 - R_2} = \frac{R_5 + R_{10}}{R_5^2}$$

The meter $M_2$, being connected to the wiper 28 through $S_{4b}$, then reads this voltage on a scale calibrated directly in terms of the capacitance $C_1$ of the circuit 10 according to the equation $$C_1 = \frac{1}{H_1} \cdot \frac{T_1 - T_2}{R_1 - R_2}$$

The integrating amplifier $A_8$ may be reset to zero for subsequent measurements by closing the pushbutton switch $S_3$ to bypass the output 34 to ground; in some cases it may also be necessary to provide another set of contacts (not shown) for $S_3$ in order to unlatch $D_3$ before a subsequent measurement is begun.

Figure 5:
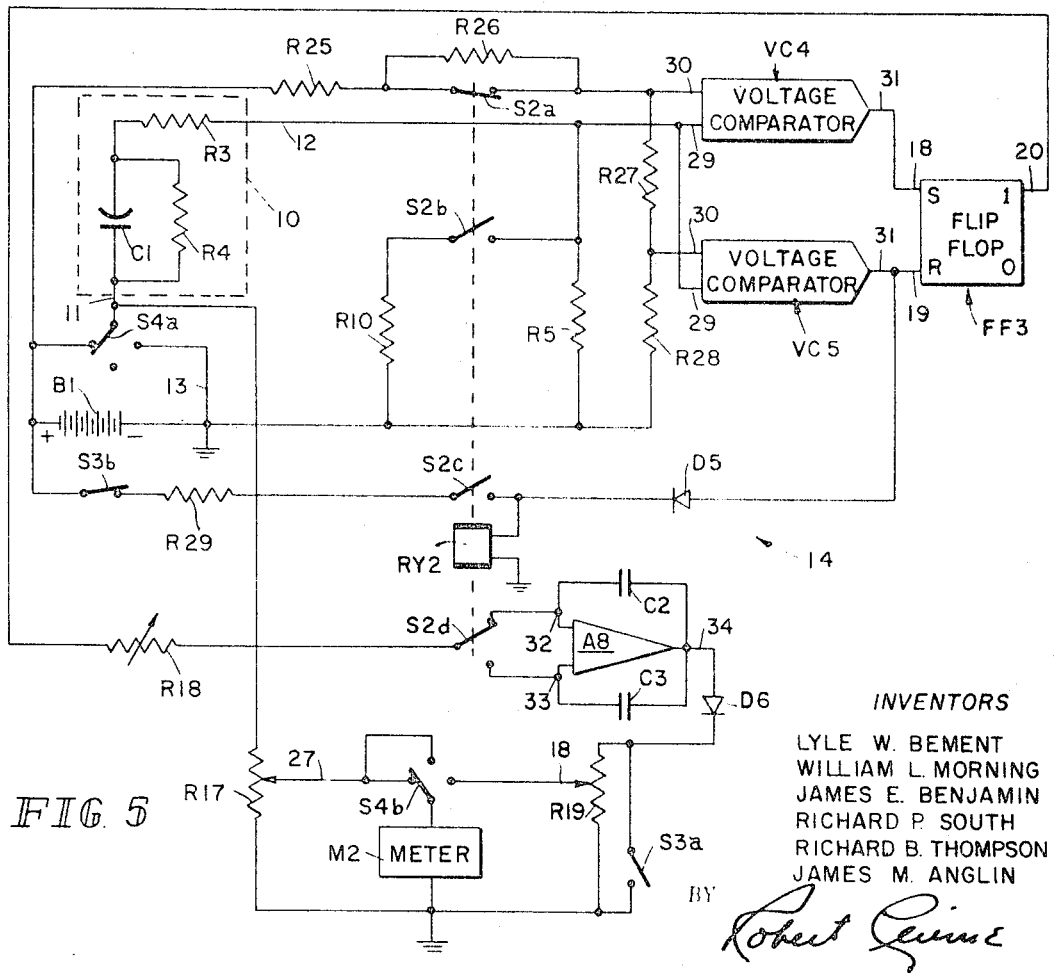
FIGURE 5 illustrates a third form of the invention.

The circuit diagram of FIGURE 5 presents a third form of an instrument according to the invention. This form incorporates the factor $H_1$ and allows the use of but two voltage comparators $VC_4$ and $VC_5$ and a single flip-flop $FF_3$ by the use of a multi-function relay $RY_2$. In this form, the voltage $E_m(t)$ across $R_k$ is presented to the inputs 29 of $VC_4$ and $VC_5$, while four reference voltages $E_{r1}$, $E_{r2}$, $E_{r3}$ and $E_{r4}$ are supplied by the switched voltage divider comprising the resistors $R_{25}$ through $R_{28}$ and a set of switch contacts $S_{2a}$. During measurement of the first interval $T_1$, the contacts $S_{2a}$ are closed, so that $R_{25}$, $R_{27}$ and $R_{28}$ provide $E_{r1}$ and $E_{r2}$, where $$\frac{E_{r2}}{E_{r1}} = \rho_1$$

to the inputs 29 of $VC_4$ and $VC_5$ respectively. The comparators $VC_4$ and $VC_5$ and the flip-flop $FF_3$ then provide a constant voltage at the output 20 of $FF_3$ during the interval $T_1 = t_1 - t_2$, as has been described previously. The single variable resistor $R_{18}$ here replaces the ganged resistors $R_{18a}$ and $R_{18b}$ of FIGURE 4 for introducing the correction factor $H_1$ into the scale factors of $A_8$. During $T_1$, a set of switch contacts $S_{2d}$ connects $R_{18}$ and the output 20 to the additive input 32 of the integrating operational amplifier $A_8$, and a voltage corresponding to $T_1$ is stored at the output 34.

At a time $t_2$, the end of the first interval $T_1$, a pulse from the output 31 of $VC_5$ flows through the isolation diode $D_5$ and energizes the coil of the relay $RY_2$, which in turn opens the switch contacts $S_{2a}$, closes the switch contacts $S_{2b}$ and $S_{2c}$, and moves the arm of $S_{2d}$ to its lower position. The voltage divider now comprises $R_{25} + R_{26}$, $R_{27}$ and $R_{28}$ to supply a new and lower pair of reference voltages $E_{r3}$ and $E_{r4}$, where $$\frac{E_{r4}}{E_{r3}} = \rho_2 = \rho_1$$

to the inputs 30 of $VC_4$ and $VC_5$. The still-decreasing voltage $E_m(t)$ continues to be applied to the inputs 29. The closed contacts $S_{2c}$ now allow voltage from $B_1$ to flow through the normally-closed contacts $S_{3b}$ and a dropping resistor $R_{29}$ to latch the relay $RY_2$ after the pulse from $VC_5$ has ended; the isolation diode $D_5$ prevents the voltage in the coil of $RY_2$ from being fed back into the input 19 of $FF_3$. The comparators $VC_4$ and $VC_5$ and the flip-flop $FF_3$ now generate a constant voltage between the times $t_3$, when $E_m(t_3) = E_{r3}$, and $t_4$ when $E_m(t_4) = E_{r4}$, thus defining the second interval $T_2 = t_4 - t_3$. This constant voltage is now, however, fed through $R_{18}$ to the subtractive input 33 of $A_8$; thus the voltage at the output 34 of $A_8$ is now the same as that developed previously in FIGURE 4. The remainder of the measurement is identical to that described for FIGURE 4. It will be noted that the switching speed of $RY_2$ need not be particularly rapid, since $R_{26}$ may be selected so that $t_2 \neq t_3$. A pushbutton switch having a set of normally-open contacts $S_{3a}$ and a set of normally-closed contacts $S_{3b}$ may be used to reset the instrument for subsequent measurement; $S_{3a}$ discharges the ouput 34 of $A_8$ to ground, and $S_{3b}$ unlatches $RY_2$ by depriving it of power from $B_1$.

Having described several embodiments of our invention by way of illustration rather than by way of limitation, we claim:

1. An instrument for measuring capacitance of a circuit having unknown resistances associated therewith, comprising means selectively operable to charge said circuit from a source of potential or to discharge said circuit through a first known resistance; timer means for measuring first and second time intervals, each of said intervals being defined by a predetermined ratio change in voltage across said known resistance; means operable to select a first value of said known resistance during said first interval and to select a second value of said known resistance during said second interval; means for scaling said time intervals in accordance with said predetermined ratios; means for obtaining an arithmetic difference between said scaled intervals; means for scaling said difference in accordance with said first and second values of said known resistance; display means responsive to said latter scaling means for indicating said scaled difference in terms of the capacitance of said circuit.

2. An instrument according to claim 1 wherein said means for selecting first and second values of said resistance is controlled by said timer means to select said second value upon the completion of said first interval.

3. An instrument according to claim 1 further comprising means for resetting said timer for subsequent measurements.

4. An instrument according to claim 1 wherein said predetermined ratios are equal to each other.

5. An instrument according to claim 4 wherein said predetermined ratios are equal to $e^c$, where $c$ is selected from the group consisting of $+1$ and $-1$.

6. An instrument according to claim 1 wherein said timer means includes means for storing the values of said first and second time intervals.

7. An instrument according to claim 1 wherein said selectively operable means is also operable to open said circuit for measurement of an open-circuit voltage across said capacitance, and wherein said instrument further comprises a means for measuring said open-circuit voltage and the voltage of a source of charging potential for said circuit, and for obtaining a ratio therebetween; and means for scaling said difference in accordance with said ratio, whereby errors in measuring said capacitance arising from shunt resistance in said circuit are reduced.

8. An instrument for measuring the capacitance of a circuit having unknown resistances associated therewith, comprising a switch selectively operable to charge said circuit from a source of potential or to discharge said circuit through a known resistance; a switch for selecting first or second values of said known resistance; a timer for measuring a first interval required for said circuit to discharge by a first predetermined voltage ratio through said first value of said known resistance and for measuring a second interval required for said circuit to discharge by a second predetermined voltage ratio through said second value of said known resistance; means for scaling said time intervals in accordance with said predetermined ratios; an analog subtractor for providing a signal related to the arithmetical difference between said time intervals; an analog scaler for rendering said difference signal proportional to an arithmetic difference between said first and second values of said known resistance; and a meter responsive to said scaled difference signal and calibrated to indicate directly the capacitance of said circuit.

9. An instrument according to claim 8 wherein said scaled difference signal is also related to said predetermined ratios.

10. An instrument according to claim 9 wherein said analog subtractor provides a signal proportional to the arithmetic difference between said first time interval divided by the negative natural logarithm of said first predetermined ratio, and said second time interval divided by the negative natural logarithm of said second time interval.

11. An instrument according to claim 9 wherein said timer provides a first signal proportional to said first time interval and to said first predetermined ratio, and a second signal proportional to said second time interval and to said second predetermined ratio.

12. An instrument according to claim 9 wherein said predetermined ratios are equal to each other.

13. An instrument according to claim 12 wherein said analog scaler further relates said difference signal to said predetermined ratios.

14. An instrument according to claim 12 wherein said predetermined ratios are equal to $1/e$.

15. An instrument according to claim 8 wherein said timer includes means for providing marking signals indicating the beginning and end of each of said intervals.

16. An instrument according to claim 15 wherein said means for providing marking signals comprises a source providing three reference voltages related to each other by said predetermined ratios; and three voltage comparators, a first operable to produce a marking signal at the beginning of said first interval, a second operable to provide a marking signal at the simultaneous end of said first interval and beginning of said second interval, and a third operable to provide a marking signal at the end of said second interval.

17. An instrument according to claim 15 wherein said means for providing marking signals comprises a source providing two pairs of reference voltages, the voltages within each of said pairs being related to each other by one of said predetermined ratios; and two pairs of voltage comparing means, each of said means being operable to provide one of said marking signals when the voltage across said known resistance equals a specified one of said reference voltages.

18. An instrument according to claim 17 wherein each of said voltage comparing means comprises a differential operational amplifier having an additive input responsive to said specified reference voltage and a subtractive input responsive to said voltage across said known resistance, whereby said amplifier produces one of said marking signals when the voltage at said additive input exceeds the voltage at said subtractive input.

19. An instrument according to claim 15 wherein said means for providing marking signals comprises a source selectively providing two pairs of reference voltages, the voltages within each of said pairs being related to each other by one of said predetermined ratios; a pair of voltage comparing means, each of said means being operable to provide one of said marking signals when the voltage across said known resistance equals a specified one of said reference voltages; switch means controlled by said switch for selecting first or second values of said known resistance, said switch means providing a first pair of said reference voltages to said pair of voltage comparing means when said first value of known resistance is selected, and providing a second pair of said reference voltages thereto when said second value is selected.

20. An instrument according to claim 15 wherein said timer further includes means responsive to said means for providing marking signals and therefrom generating a pair of signals, each of which is proportional to one of said time intervals.

21. An instrument according to claim 20 wherein said means generating a pair of signals comprises a pair of means each producing a constant output voltage, activated by specified one of said marking signals and deactivated by another specified one of said marking signals; and a pair of integrator means each integrating one of said constant output voltages.

22. An instrument according to claim 20 wherein said means generating a pair of signals comprises at least one means producing a constant output voltage responsive to said means providing marking signals; and a means for integrating said constant output voltage.

23. An instrument according to claim 22 wherein said means producing a constant output voltage comprises a flip-flop having set and reset inputs, wherein said constant output voltage is produced after activation of said set input by one of said marking signals until said reset input is activated by another of said marking signals.

24. An instrument according to claim 22 wherein said means for integrating said constant output voltage comprises an analog integrator having a pair of inputs, one or the other of said inputs being selectively connected to said means for producing a constant output voltage through a switch controlled by said means for selecting first and second values of said known resistance.

25. An instrument according to claim 8 wherein said analog subtractor comprises a differential amplifier having an additive input responsive to a voltage from said timer proportional to said first interval and having a subtractive input responsive to a voltage from said timer proportional to said second time interval.

26. An instrument according to claim 8 wherein said subtractor also scales each of said time intervals according to a corresponding one of said predetermined ratios.

27. An instrument according to claim 8 wherein said analog scaler comprises an operational amplifier having a gain adjustable to a value proportional to said difference between said first and second values of said known resistance.

References Cited

FOREIGN PATENTS 898,164   11/1953   Germany.

EDWARD E. KUBASIEWICZ, Primary Examiner